(12) United States Patent
Plotkin et al.

(10) Patent No.: US 8,573,196 B2
(45) Date of Patent: Nov. 5, 2013

(54) STARTUP/SHUTDOWN SYSTEMS AND METHODS FOR A SOLAR THERMAL POWER GENERATING FACILITY

(75) Inventors: Andrew Plotkin, Worcester, MA (US); Craig Gillum, West Boylston, MA (US); Kevin Toupin, Princeton, MA (US); Robert Kunkel, Leominster, MA (US); Gabriel Kaufmann, Beit Hananya (IL); Leon Afremov, Yehud (IL); Yona Magen, Brookline, MA (US)

(73) Assignee: Babcock Power Services, Inc., Worcester, MA (US)

( * ) Notice: Subject to any disclaimer, the term of this patent is extended or adjusted under 35 U.S.C. 154(b) by 568 days.

(21) Appl. No.: 12/850,862

(22) Filed: Aug. 5, 2010

(65) Prior Publication Data

US 2012/0031395 A1 Feb. 9, 2012

(51) Int. Cl.
*F24J 2/42* (2006.01)
*F24J 2/04* (2006.01)
*B60K 16/00* (2006.01)
*F03G 6/00* (2006.01)

(52) U.S. Cl.
USPC ....... 126/609; 60/641.8; 60/641.15; 126/640; 126/646

(58) Field of Classification Search
USPC ............... 126/609, 615, 640, 646, 572–575, 126/601–602; 60/641.8, 641.15
See application file for complete search history.

(56) References Cited

U.S. PATENT DOCUMENTS

| | | | |
|---|---|---|---|
| 2,081,534 A * | 5/1937 | Forward | 208/71 |
| 2,383,234 A | 8/1945 | Barnes | |
| 3,197,343 A | 7/1965 | Palmatier | |
| 3,208,877 A | 9/1965 | Merry | |
| 3,325,312 A | 6/1967 | Sonntag, Jr. | |
| 3,450,192 A | 6/1969 | Hay | |
| 3,459,597 A | 8/1969 | Baron | |
| 3,464,402 A | 9/1969 | Collura | |
| 3,822,692 A | 7/1974 | Demarest | |

(Continued)

FOREIGN PATENT DOCUMENTS

| | | |
|---|---|---|
| DE | 2711291 B * | 12/1977 |
| FR | 2501839 A1 | 9/1982 |

(Continued)

OTHER PUBLICATIONS

Derwent Abstract: DE 2711291.*

(Continued)

*Primary Examiner* — Kenneth Rinehart
*Assistant Examiner* — Tavia Sullens
(74) *Attorney, Agent, or Firm* — Edwards Wildman Palmer LLP; George W. Neuner; Joshua L. Jones

(57) ABSTRACT

A startup system for a solar boiler includes a main fluid circuit having a plurality of solar boiler panels for generating power from solar energy. An auxiliary fluid circuit is selectively connected in fluid communication with the main fluid circuit by a plurality of valves. An auxiliary boiler is operatively connected to the auxiliary fluid circuit. The valves connecting the auxiliary fluid circuit to the main fluid circuit are configured to be opened and closed to selectively place the auxiliary boiler in fluid communication with portions of the main fluid circuit to supply heat to the portions of the main fluid circuit in preparation to produce power from solar energy.

12 Claims, 10 Drawing Sheets

(56) References Cited

U.S. PATENT DOCUMENTS

| | | |
|---|---|---|
| 3,823,703 A | 7/1974 | Lanciault |
| 3,893,506 A | 7/1975 | Laing |
| 3,924,604 A | 12/1975 | Anderson |
| 3,927,659 A | 12/1975 | Blake et al. |
| 3,951,108 A | 4/1976 | Rees |
| 3,968,652 A | 7/1976 | Chevalier |
| 3,991,742 A | 11/1976 | Gerber |
| 3,995,804 A | 12/1976 | Folds et al. |
| 4,003,366 A | 1/1977 | Lightfoot |
| 4,037,639 A | 7/1977 | Jones |
| 4,088,266 A | 5/1978 | Keyes |
| 4,094,147 A | 6/1978 | Alleau et al. |
| 4,112,921 A | 9/1978 | MacCracken |
| 4,120,288 A | 10/1978 | Barrett |
| 4,127,102 A | 11/1978 | Berman |
| 4,127,103 A | 11/1978 | Klank et al. |
| 4,128,096 A | 12/1978 | Katz |
| 4,136,674 A | 1/1979 | Korr |
| 4,171,617 A * | 10/1979 | Sakamoto et al. ........... 60/641.8 |
| 4,191,246 A | 3/1980 | Cassell |
| 4,204,523 A | 5/1980 | Rothe |
| 4,205,658 A | 6/1980 | Clark |
| 4,210,122 A | 7/1980 | Artweger |
| 4,215,676 A | 8/1980 | Gilliam |
| 4,237,861 A | 12/1980 | Fayard et al. |
| 4,245,618 A | 1/1981 | Wiener |
| 4,253,801 A | 3/1981 | O'Hare |
| 4,257,477 A | 3/1981 | Maloney |
| 4,261,330 A | 4/1981 | Reinisch |
| 4,265,223 A | 5/1981 | Miserlis et al. |
| 4,269,172 A | 5/1981 | Parker et al. |
| 4,273,100 A | 6/1981 | Cogliano |
| 4,280,483 A | 7/1981 | Schaffer |
| 4,289,114 A | 9/1981 | Zadiraka |
| 4,296,730 A | 10/1981 | Zadiraka |
| 4,296,733 A | 10/1981 | Saunders |
| 4,312,687 A | 1/1982 | Sigworth, Jr. |
| 4,313,304 A | 2/1982 | Hunt |
| 4,320,663 A | 3/1982 | Francia |
| 4,324,229 A | 4/1982 | Risser |
| 4,338,991 A | 7/1982 | Sigworth, Jr. |
| 4,350,374 A | 9/1982 | Brollo |
| 4,353,356 A | 10/1982 | Vandenbossche |
| 4,359,043 A | 11/1982 | Dominique et al. |
| 4,367,726 A | 1/1983 | Maes, Jr. |
| 4,371,035 A | 2/1983 | Soligno |
| 4,373,512 A | 2/1983 | Hirt |
| 4,380,996 A | 4/1983 | Mengeringhausen |
| 4,384,550 A | 5/1983 | Miller |
| 4,394,859 A | 7/1983 | Drost |
| 4,404,960 A | 9/1983 | Laing |
| 4,416,265 A | 11/1983 | Wallace |
| 4,428,361 A | 1/1984 | Straza |
| 4,432,341 A | 2/1984 | Howe et al. |
| 4,454,863 A | 6/1984 | Brown et al. |
| 4,485,803 A | 12/1984 | Wiener |
| 4,503,903 A | 3/1985 | Kramer |
| 4,512,336 A | 4/1985 | Wiener |
| 4,535,755 A | 8/1985 | Roberts |
| 4,569,331 A | 2/1986 | Tani et al. |
| 4,615,381 A | 10/1986 | Maloney |
| 4,653,470 A | 3/1987 | Carli et al. |
| 4,660,630 A | 4/1987 | Cunningham et al. |
| 4,665,894 A | 5/1987 | Juhasz |
| 4,712,338 A | 12/1987 | Trickel |
| 4,768,345 A | 9/1988 | Kardas |
| 4,832,119 A | 5/1989 | Bloor et al. |
| 4,867,133 A | 9/1989 | Sadler |
| 4,946,512 A | 8/1990 | Fukuroi et al. |
| 4,972,806 A | 11/1990 | Marsault |
| 5,163,821 A | 11/1992 | Kelly et al. |
| 5,174,128 A | 12/1992 | Bourne et al. |
| 5,201,282 A | 4/1993 | Albrecht |
| 5,217,000 A | 6/1993 | Pierce-Bjorklund |
| 5,342,016 A | 8/1994 | Marsault et al. |
| 5,368,092 A | 11/1994 | Rearden et al. |
| 5,396,865 A * | 3/1995 | Freeh ........................ 122/406.5 |
| 5,404,937 A | 4/1995 | Assaf et al. |
| 5,417,052 A | 5/1995 | Bharathan et al. |
| 5,444,972 A | 8/1995 | Moore |
| 5,482,233 A | 1/1996 | Marko et al. |
| 5,694,774 A | 12/1997 | Drucker |
| 5,727,379 A | 3/1998 | Cohn |
| 5,823,176 A | 10/1998 | Harris |
| 5,850,831 A | 12/1998 | Marko |
| 5,857,322 A | 1/1999 | Cohn |
| 5,862,800 A | 1/1999 | Marko |
| 5,881,456 A | 3/1999 | Bergins et al. |
| 5,943,985 A | 8/1999 | Hartman |
| 6,126,120 A | 10/2000 | Quaranta et al. |
| 6,155,339 A | 12/2000 | Grapengater |
| 6,173,927 B1 | 1/2001 | Delsol |
| 6,240,156 B1 | 5/2001 | Matsumoto et al. |
| 6,301,928 B1 | 10/2001 | Tanatsugu et al. |
| 6,434,942 B1 | 8/2002 | Charlton |
| 6,487,859 B2 | 12/2002 | Mehos et al. |
| 6,497,102 B2 | 12/2002 | Liebig |
| 6,532,953 B1 | 3/2003 | Blackmon et al. |
| 6,668,555 B1 | 12/2003 | Moriarty |
| 6,708,687 B2 | 3/2004 | Blackmon, Jr. et al. |
| 6,736,134 B2 | 5/2004 | Marko |
| 6,913,015 B2 | 7/2005 | Pajk |
| 6,926,440 B2 | 8/2005 | Litwin |
| 6,931,851 B2 | 8/2005 | Litwin |
| 7,011,086 B2 | 3/2006 | Litwin |
| 7,600,350 B2 | 10/2009 | Braunstein |
| 7,640,746 B2 | 1/2010 | Skowronski et al. |
| 7,806,377 B2 | 10/2010 | Strizki |
| 2001/0010222 A1 | 8/2001 | Prueitt |
| 2002/0029869 A1 | 3/2002 | Kodumudi et al. |
| 2003/0041856 A1 | 3/2003 | Blackmon et al. |
| 2004/0035111 A1 | 2/2004 | Ven et al. |
| 2004/0112374 A1 | 6/2004 | Litwin |
| 2004/0139961 A1 | 7/2004 | Blackmon et al. |
| 2004/0244376 A1 | 12/2004 | Litwin et al. |
| 2004/0251002 A1 | 12/2004 | Reichle et al. |
| 2004/0255571 A1 | 12/2004 | Fetescu et al. |
| 2005/0016524 A1 | 1/2005 | Broatch |
| 2006/0225863 A1 | 10/2006 | Levin |
| 2006/0260314 A1 | 11/2006 | Kincaid et al. |
| 2007/0084207 A1 | 4/2007 | Zuili et al. |
| 2007/0089775 A1 | 4/2007 | Lasich |
| 2007/0119718 A1 | 5/2007 | Gibson et al. |
| 2007/0227531 A1 | 10/2007 | Garcia Cors et al. |
| 2007/0295382 A1 | 12/2007 | Oak |
| 2008/0000231 A1 | 1/2008 | Litwin et al. |
| 2008/0022685 A1 | 1/2008 | Zhu |
| 2008/0053523 A1 | 3/2008 | Brown et al. |
| 2008/0078378 A1 | 4/2008 | Zhu |
| 2008/0092551 A1 | 4/2008 | Skowronski |
| 2008/0256953 A1 | 10/2008 | Arkas et al. |
| 2008/0302357 A1 | 12/2008 | DeNault |
| 2009/0014057 A1 | 1/2009 | Croft et al. |
| 2009/0101134 A1 | 4/2009 | Merrett |
| 2009/0107146 A1 | 4/2009 | Lin |
| 2009/0114269 A1 | 5/2009 | Fletcher et al. |
| 2009/0114270 A1 | 5/2009 | Stancel |
| 2009/0199557 A1 | 8/2009 | Bennett |
| 2009/0211249 A1 | 8/2009 | Wohrer et al. |
| 2009/0250051 A1 | 10/2009 | Lata Perez |
| 2009/0260359 A1* | 10/2009 | Palkes ........................ 60/641.8 |
| 2009/0276993 A1 | 11/2009 | Fedock et al. |
| 2010/0162700 A1 | 7/2010 | Birnbaum et al. |

(56) References Cited

U.S. PATENT DOCUMENTS

| | | |
|---|---|---|
| 2010/0229853 A1 | 9/2010 | Vandal et al. |
| 2010/0236183 A1 | 9/2010 | Cusson et al. |

FOREIGN PATENT DOCUMENTS

| | | |
|---|---|---|
| JP | 53131309 A | 11/1978 |
| JP | 08326223 A | 12/1996 |
| WO | WO-2008154599 A1 | 12/2008 |

OTHER PUBLICATIONS

PCT International Search Report and Written Opinion dated Aug. 4, 2011 issued on corresponding International patent application No. PCT/US2011/046644.

U.S. Appl. No. 60/943,096, Kroizer.

International Search Report and Written Opinion, dated Aug. 30, 2010 for PCT/US2010/023124.

International Search Report and Written Opinion, dated Aug. 31, 2010 for PCT/US2010/023165.

International Search Report and Written Opinion, dated Oct. 13, 2010 for PCT/US2010/023622.

International Search Report and Written Opinion, dated Oct. 13, 2010 for PCT/US2010/023826.

International Search Report and Written Opinion, dated Dec. 13, 2010 for PCT/US2010/023367.

International Search Report and Written Opinion, dated Dec. 13, 2010 for PCT/US2010/023500.

\* cited by examiner

STARTUP/SHUTDOWN SYSTEMS AND METHODS FOR A SOLAR THERMAL POWER GENERATING FACILITY

BACKGROUND OF THE INVENTION

1. Field of the Invention

The present invention relates to solar power production, and more particularly to systems and methods of power production with solar boilers.

2. Description of Related Art

Solar power generation has been considered a viable source to help provide for energy needs in a time of increasing consciousness of the environmental aspects of power production. Solar energy production relies mainly on the ability to collect and convert energy freely available from the sun and can be produced with very little impact on the environment. Solar power can be produced without creating radioactive waste as in nuclear power production, and without producing pollutant emissions including greenhouse gases as in fossil fuel power production. Solar power production is independent of fluctuating fuel costs and does not consume non-renewable resources.

Solar power generators generally employ fields of controlled mirrors, called heliostats, to gather and concentrate sunlight on a receiver to provide a heat source for power production. A solar receiver typically takes the form of a panel of tubes conveying a working fluid therethrough. Previous solar generators have used working fluids such as molten salt because it has the ability to store energy, allowing power generation when there is little or no solar radiation, such as at night time. The heated working fluids are typically conveyed to a heat exchanger where they release heat into a second working fluid such as air, water, or steam. Power is generated by driving heated air or steam through a turbine that drives an electrical generator.

More recently, it has been determined that solar production can be increased and simplified by using water/steam as the only working fluid in a receiver that is a boiler. This can eliminate the need for an inefficient heat exchanger between two different working fluids. This development has lead to new challenges in handling the intense solar heat without damage to the system. In a solar boiler, heat transfer rates can reach levels around 2-3 times the heat transfer rate of a typical fossil fuel fired boiler. This high heat transfer rate intensifies problems related to maintaining even heating and flow distribution throughout known designs of boiler panels. If flow through a portion of a receiver panel is insufficient when using water/steam as a working fluid, overheating can result for that panel portion. Such overheating can result in damage or failure of the panel and its constituent tubes if the temperatures are allowed to become severe.

Another way in which solar boilers differ from fossil fuel fired boilers is in terms of operating hours. Fossil fuel fired boilers typically operate continuously, stopping only for occasional routine maintenance, whereas solar boilers must start up and shut down once per day due to the rising and setting of the sun. Any working fluid and boiler components that cool down during the overnight layover must be brought back up to operating temperature each morning. There results a daily thermal expansion cycle that can result in increased fatigue failure in typical boiler components.

Traditional boiler designs use considerable time in starting up and shutting down. Since solar power is only available during daylight hours each day, these lengthy start up and shut down cycles can deprive the system of valuable operating hours that could otherwise be used for power production. One reason for the lengthy start up and shut down times is the difference in day time operating temperature and layover temperature at night, which can reach freezing temperatures. For example, starting a traditional boiler system too rapidly under these conditions can exacerbate the thermal expansion issues described above. On the other hand, starting a traditional boiler system too slowly can result in a failure to adequately circulate fluids through the boiler tubes, which can lead to boiler tube failure under the intense heat flux.

Such conventional methods and systems have generally been considered satisfactory for their intended purpose. However, there is still an need in the art for systems and methods that allow for improved startup and shut down of solar boilers. There also remains a need in the art for such systems and methods that are easy to make and use. The present invention provides a solution for these problems.

SUMMARY OF THE INVENTION

The subject invention is directed to a new and useful startup system for a solar boiler. The system includes a main fluid circuit having a plurality of solar boiler panels for generating power from solar energy. An auxiliary fluid circuit is selectively connected in fluid communication with the main fluid circuit by a plurality of valves. An auxiliary boiler is operatively connected to the auxiliary fluid circuit. The valves connecting the auxiliary fluid circuit to the main fluid circuit are configured to be opened and closed to selectively place the auxiliary boiler in fluid communication with portions of the main fluid circuit to supply heat to the portions of the main fluid circuit in preparation to produce power from solar energy.

In accordance with certain embodiments, the auxiliary boiler is a fuel fired boiler. Any suitable type of boiler can also be used, including, for example, liquid fuel fired, coal fired, biomass fired, natural gas fired, nuclear, geothermal, and electric. It is contemplated that the main fluid circuit can include a drum for separating steam from liquid water. The plurality of solar boiler panels can include a plurality of steam generator panels, a plurality of superheater panels, and a plurality of reheater panels each configured to transfer solar energy into the main fluid circuit. The drum can be operatively connected to the steam generator panels to receive saturated water-steam therefrom, and operatively connected to supply steam to the superheater panels.

In certain embodiments, a drum isolation valve is operatively connected to the main fluid circuit to selectively isolate the drum from other portions of the main fluid circuit to preserve thermal energy within the drum during inactive periods of the solar boiler panels. The drum can be insulated to preserve heat therein during layover periods with the solar boiler panels inactive.

The system can include a steam generator isolation valve in the main fluid circuit in an outlet of the drum. In an open state, the steam generator isolation valve connects the steam generator panels to the drum to heat the steam generator panels to a temperature around that of the drum using heat from solar energy. The plurality of valves connecting the auxiliary fluid circuit to the main fluid circuit can include a superheater isolation valve that in an open state connects the auxiliary fluid circuit to a portion of the main fluid circuit that includes the superheater and reheater panels for building temperatures therein for full solar operation in the main fluid circuit.

In accordance with certain embodiments, a first turbine bypass valve in an open state connects the superheater panels in direct series with the reheater panels, and a second turbine bypass valve in an open state connects the reheater panels to a condenser in the main fluid circuit in preparation for full solar operation. It is also contemplated that in certain embodiments a first turbine valve in an open state connects a first turbine stage in series between the superheater panels and the reheater panels with the first turbine bypass valve closed, and a second turbine valve in an open state connects a second turbine stage in series between the reheater panels and the condenser with the second turbine bypass valve closed.

The invention also provides a method of starting up a solar boiler. The method includes circulating fluids heated by an auxiliary boiler through an auxiliary fluid circuit that includes a plurality of superheater panels to elevate temperatures within the superheater panels. Fluids are circulated through a plurality of steam generator panels exposed to solar radiation to elevate temperatures within the steam generator panels. The method also includes supplying steam from the steam generator panels to the superheater panels to bring the drum and superheater panels up to an operational temperature for producing solar power by connecting the drum to the steam generator panels, connecting a drum to the superheater panels by opening a drum isolation valve connected between the drum and the superheater panels, and disconnecting the auxiliary boiler from the superheater panels by closing an auxiliary boiler bypass valve connected between the superheater panels and the auxiliary boiler.

In accordance with certain embodiments, the step of connecting the drum to the superheater panels includes connecting a plurality of reheater panels in series between the superheater panels and a condenser to bring the superheater panels and the reheater panels up to an operational temperature for producing solar power. The method can include connecting a first turbine stage in series between the superheater panels and the reheater panels by opening a first turbine valve connected between the superheater panels and the first turbine stage and closing a first turbine bypass valve connected between the superheater panels and the reheater panels, and connecting a second turbine stage in series between the reheater panels and the condenser by opening a second turbine valve connected between the reheater panels and the second turbine stage and closing a second turbine bypass valve connected between the reheater panels and the condenser.

The step of circulating fluids through a plurality of steam generator panels exposed to solar radiation to elevate temperatures within the steam generator panels can include heating fluids within the steam generator panels to a temperature within about ±100° F. of that within the drum. The step of circulating fluids heated by an auxiliary boiler through an auxiliary fluid circuit can be initiated prior to local sunrise.

The step of connecting the drum to the steam generator panels can be timed to occur during or after local sunrise. The step of connecting the drum to the superheater panels can include heating the superheater panels with solar heat flux. The step of connecting the drum to the superheater panels can be initiated after local sunrise.

The invention also provides a method of shutting down a solar boiler to enable subsequent rapid startup. The method includes cooling fluids in a main fluid circuit of a solar boiler to a temperature below operational temperature for power production, wherein the main fluid circuit includes a plurality of solar boiler panels and a drum. The method also includes isolating the drum from the solar boiler panels by closing at least one drum isolation valve in the main fluid circuit, wherein the drum is insulated to preserve heat therein when isolated from the solar boiler panels.

The step of cooling can include cooling fluids in the drum to a temperature within ±200° F. of maximum operating temperature of an auxiliary boiler operatively connected to the main fluid circuit to be brought selectively into fluid communication therewith to heat portions of the main fluid circuit during startup. The step of isolating the drum can include cooling fluids in the solar boiler panels to around ambient temperature. The step of cooling can be initiated prior to local sunset.

These and other features of the systems and methods of the subject invention will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein.

DETAILED DESCRIPTION OF THE PREFERRED EMBODIMENTS

Figure 1:
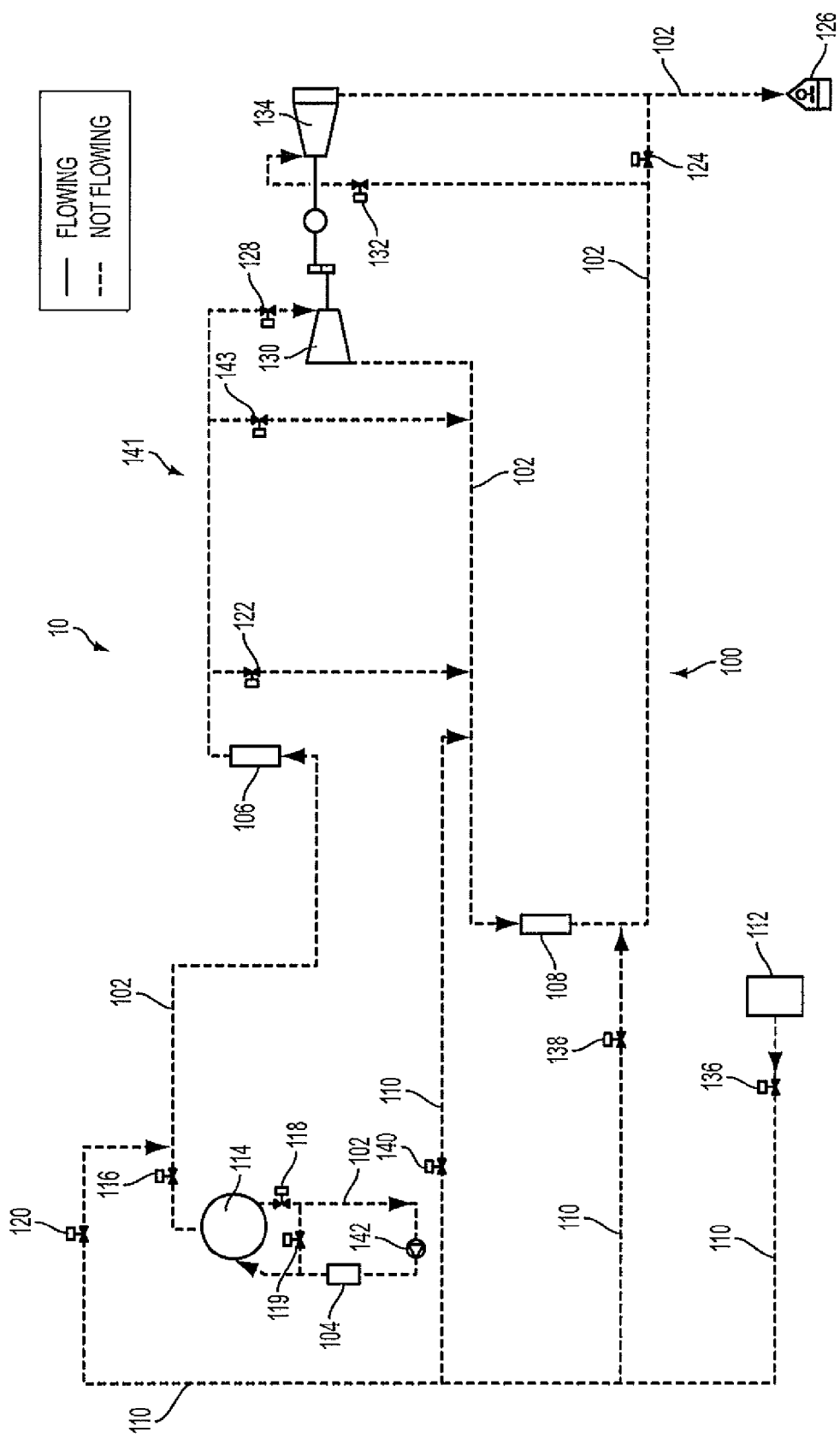
FIG. 1 is a schematic view of an exemplary embodiment of a system constructed in accordance with the present invention, showing the main and auxiliary fluid circuits of a solar boiler in a no-flow state such as when shut down during a night time layover.

Reference will now be made to the drawings wherein like reference numerals identify similar structural features or aspects of the subject invention. For purposes of explanation and illustration, and not limitation, a partial view of an exemplary embodiment of a system in accordance with the invention is shown in FIG. 1 and is designated generally by reference character 100. Other embodiments of systems in accordance with the invention, or aspects thereof, are provided in FIGS. 2-10, as will be described. The systems and methods of the invention can be used to start up solar boilers, such as after a night time layover, and shut down solar boilers, such as to begin a night time layover.

Referring to FIG. 1, startup system 10 for a solar boiler 100 is shown schematically with all of the lines shut off from fluid flow as during a night time layover or inclement weather, for example. System 10 includes a main fluid circuit 102 including a plurality of solar boiler panels for generating power from solar energy. Boiler 100 includes panels for a steam generator 104, superheater 106, and reheater 108 each configured to transfer solar energy into the main fluid circuit 102. An auxiliary fluid circuit 110 is selectively connected in fluid communication with the main fluid circuit 102 by a plurality of valves, as will be described in greater detail below.

Figure 10:
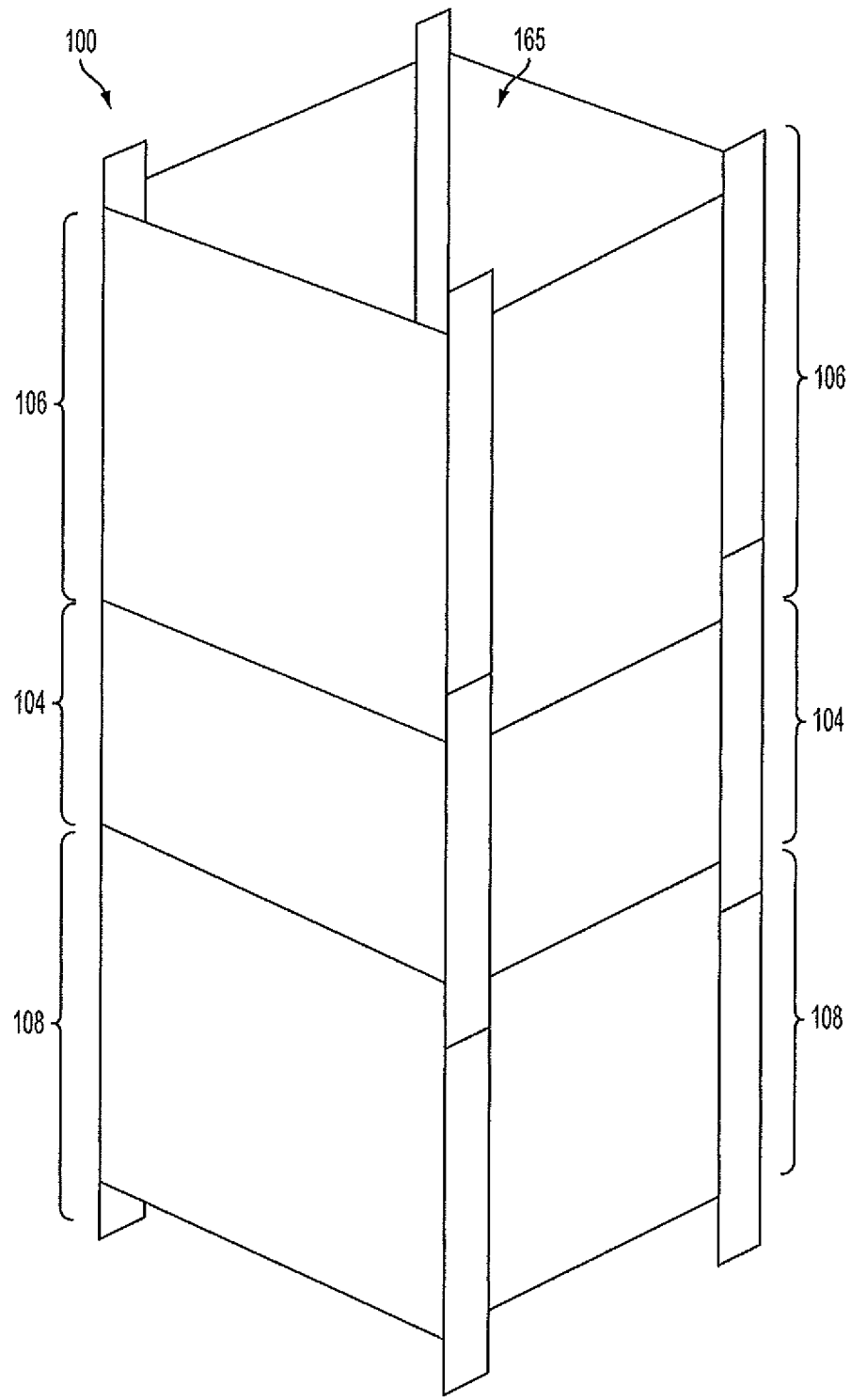
FIG. 10 is a schematic view of an exemplary solar boiler constructed in accordance with the present invention; showing vertically stacked walls of steam generator, superheater, and reheater panels.

With reference to FIG. 10, reheater 108, steam generator 104, and superheater 106 are stacked and aligned as shown in FIG. 10 with reheater 108 on the bottom, steam generator 104 in the middle, and superheater 106 on the top. With the individual solar boiler panels in close alignment with one another both horizontally and vertically, the collective surfaces of the panels create four substantially solid receiver surfaces for receiving solar radiation from heliostats on all four sides of boiler 100. The walls can be arranged to face North, East, South, and West, respectively, for example, and boiler 100 can be placed on top of a central receiver tower in a heliostat field. With such a receiver configuration, a field of heliostats can surround boiler 100 in all compass directions to supply radiation for heating the working fluid. Some or all of the remaining components of system 100 can be shielded from the heliostats within interior space 165 of solar boiler 100, or can be located elsewhere in the solar boiler tower or on the ground.

Referring again to FIG. 1, an auxiliary boiler 112 is operatively connected to auxiliary fluid circuit 110. The valves connecting auxiliary fluid circuit 110 to main fluid circuit 102 are configured to be opened and closed to selectively place auxiliary boiler 112 in fluid communication with portions of main fluid circuit 102 to supply heat to the portions of main fluid circuit 102 when solar energy is low or not available, such as during a night time layover. In accordance with certain embodiments, auxiliary boiler 112 is a fuel fired boiler, such as liquid fuel fired boiler, a coal fired boiler, a natural gas fired boiler, biomass boiler, or natural gas boiler. Any other suitable type of boiler can be used that can operate independent of the availability of sunlight, such as an electric boiler, a nuclear boiler, or a geothermal boiler.

Main fluid circuit 102 includes a drum 114 for separating steam from liquid water in a saturated steam/water flow from steam generator 104. Drum 114 is operatively connected to supply the steam to superheater 106 for further heating. Drum isolation valve 116 is included in main fluid circuit 102 to selectively isolate drum 114 from other portions main fluid circuit 102 to preserve thermal energy within drum 114 during inactive periods of the solar boiler panels, such as at night. Drum 114 is insulated to preserve heat therein during layover periods.

Figure 3:
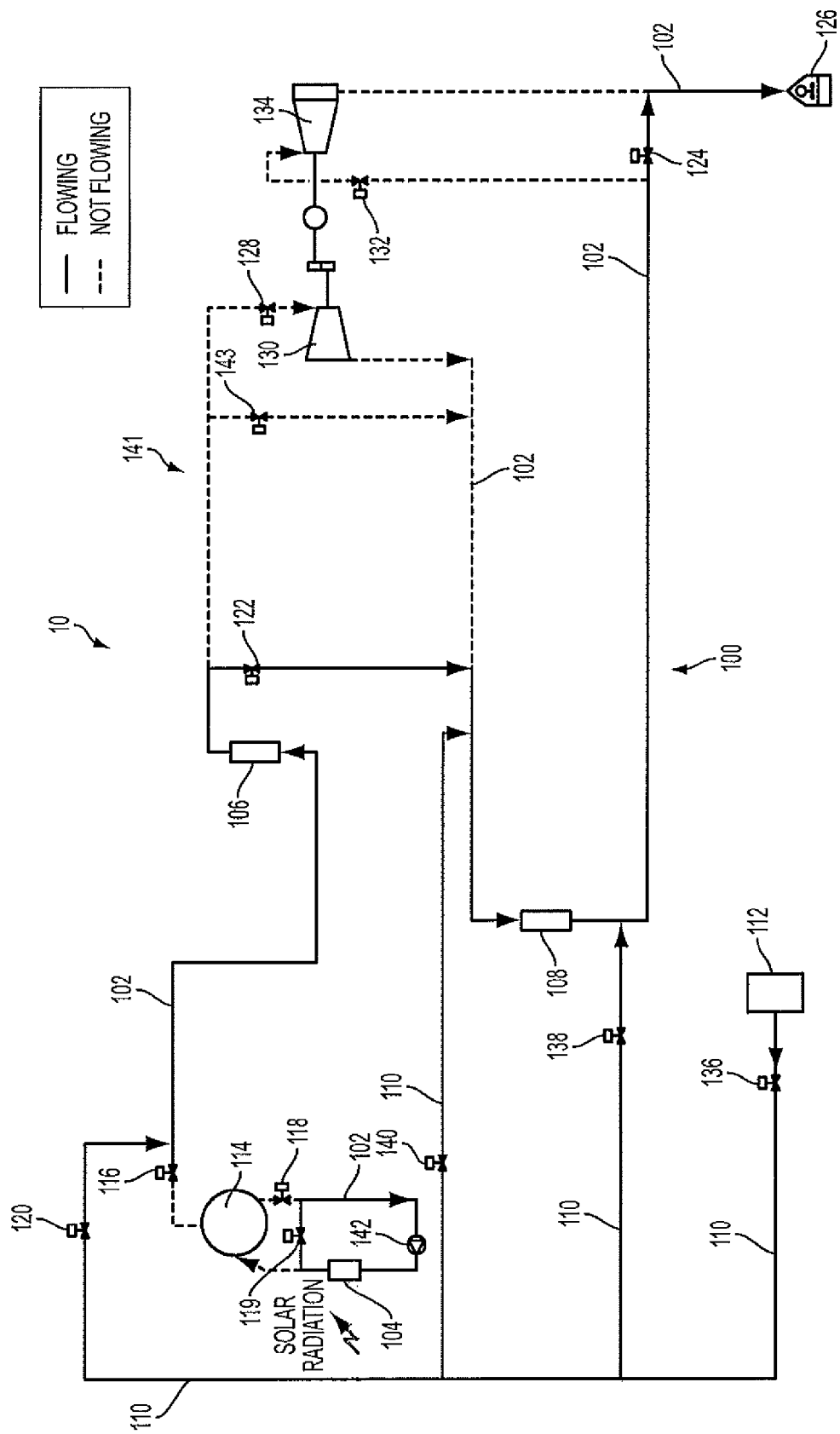
FIG. 3 is a schematic view of the system of FIG. 1, showing the system at a start-up stage where solar radiation is heating fluids circulating in the steam generator as the auxiliary boiler continues to supply heat to the superheater and reheater.
Figure 4:
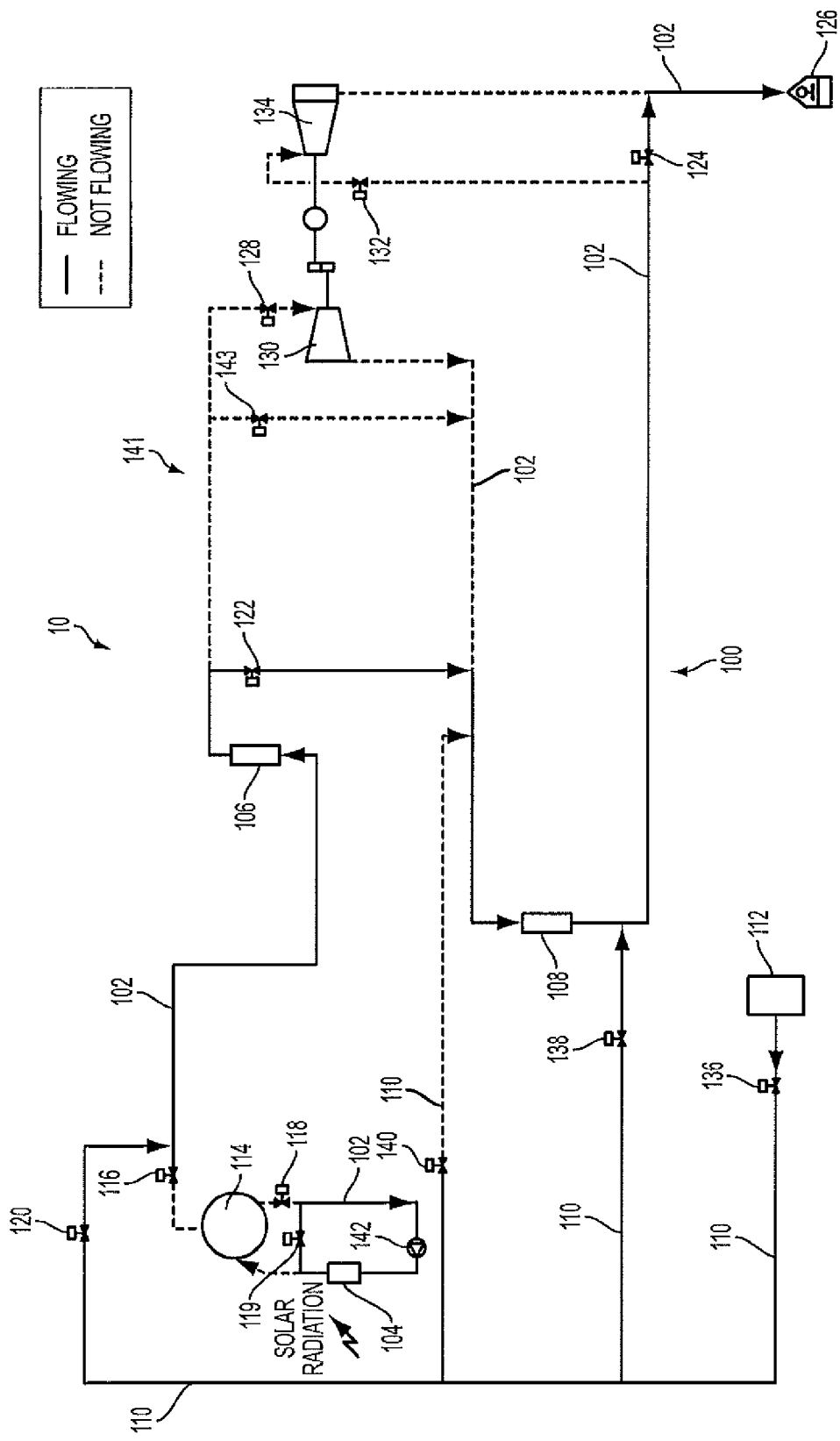
FIG. 4 is a schematic view of the system of FIG. 1, showing the system at a start-up stage where a valve connecting the auxiliary fluid circuit to the reheater inlet is closed.

A steam generator isolation valve 118 is included in main fluid circuit 102 in an outlet of drum 114. In its open state, valve 118 connects steam generator 104 to drum 114 as solar energy heats the steam generator panels to a temperature around that of the drum. A drum bypass valve 119 is included, which in its closed state cooperates with open valve 118 to connect steam generator 104 to drum 114, and in its open state, with valve 118 also closed, allows circulation through steam generator 104, bypassing drum 114 as shown in FIG. 3. A valve is not needed on the inlet of drum 114 as long as static head from drum 114 is sufficient to prevent fluids entering into the inlet of drum 114 when valve 119 is open, valve 118 is closed, and fluids are circulating through steam generator 104 as shown in FIG. 4. A superheater isolation valve 120 is also included, which in its open state connects auxiliary fluid circuit 110 to a portion of main fluid circuit 102 that includes superheater 106 and reheater 108 for building temperatures therein for full solar operation of main fluid circuit 102.

A first stage turbine bypass valve 122, in its open state, connects superheater 106 in direct series with reheater 108. An additional first stage turbine bypass valve 143, in its open state, connects superheater 106 in direct series with reheater 108. The use of valves 122 and 143 is described in greater detail below. A second stage turbine bypass valve 124, in its open state, connects reheater 108 to a condenser 126 in main fluid circuit 102 in preparation for full solar operation. A first turbine valve 128, in its open state, connects a first turbine stage 130 in series between superheater 106 and reheater 108 when valve 122 is closed. A second turbine valve 132 in its open state connects a second turbine stage 134 in series between reheater panels 108 and condenser 126 when second turbine bypass valve 124 closed.

Referring now to FIGS. 2-9, an exemplary method of starting up system 10 to bring solar boiler 100 up to full solar operation will now be described. In general, starting up solar boiler 100 in accordance with the subject invention includes circulating fluids heated by auxiliary boiler 112 through auxiliary fluid circuit 110 that includes superheater 106 and reheater 108 to elevate temperatures within the superheater and reheater panels. Those skilled in the art will readily appreciate that the method can be practiced without a reheater without departing from the spirit and scope of the invention.

Pre-warming superheater 106 and reheater 108 with auxiliary steam from auxiliary boiler 112 reduces startup time, and allows for full operation to commence earlier in the day compared to the startup time required using only solar energy. Additionally, if the boiler panels are at ambient temperature, when the heliostats resume concentrating solar radiation onto the panels, there is sufficient heat flux to overheat the tubes of the panels if they are not heated up in a controlled manner. Overheating the tubes can also lead to metal fatigue in boiler components, which can reduce the useful life of the components. Thus the rate of heating the boiler panels should be controlled to be fast enough to start generating steam quickly, but slow enough to prevent damage to the system. Thin walled components such as typical boiler tubes are less susceptible to thermal damage, since their relatively low thermal mass allows them to change temperature relatively quickly. It is particularly important to control heating and cooling of thick-walled components, including, e.g., larger headers and piping leading to the boiler panels, as well as drum 114.

Figure 2:
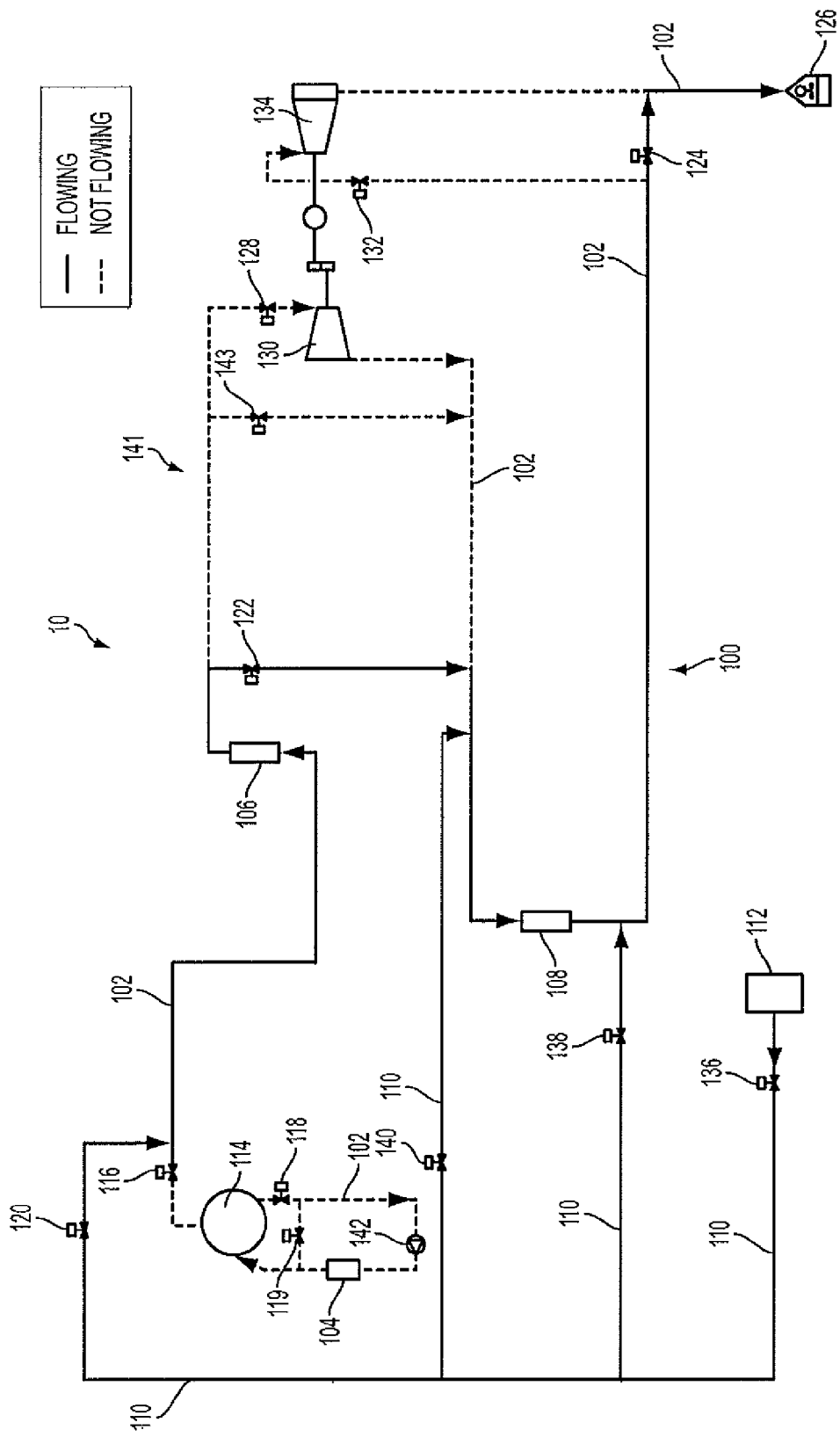
FIG. 2 is a schematic view of the system of FIG. 1, showing the system at a start-up stage where the drum is isolated from the main fluid circuit and the auxiliary boiler is operating to supply steam to the superheater and reheater via the auxiliary fluid circuit.

With reference to FIG. 2, valves 136, 138, 140, and 120 are opened to bring auxiliary boiler 112 and auxiliary fluid circuit 110 into fluid communication with main fluid circuit 102. These initial steps of circulating fluids heated by auxiliary boiler 112 through auxiliary fluid circuit 110 can be initiated prior to local sunrise, since auxiliary boiler 112 does not require sunlight. At the initial stage shown in FIG. 2, heated fluids from auxiliary boiler 112 circulate through superheater 106 and reheater 108 to warm the respective solar boiler panels up from ambient temperature.

Referring now to FIG. 3, circulation pump 142 is activated to circulate fluids through steam generator 104. After sunrise, the heliostats can focus the available sunlight on the panels of steam generator 104 to supply heat to steam generator 104 to elevate temperatures therein. Optionally, it is also possible to connect auxiliary boiler 112 to heat steam generator 104 to supply heat to steam generator 104. When fluids within steam generator 104 are heated to a temperature within about ±100° F. of that within drum 114, steam generator isolation valve 118 can be opened and drum bypass valve 119 can be closed to begin circulating through drum 114. During this state, superheater 106 and reheater 108 continue to receive heat from auxiliary boiler 112. When the temperatures within superheater 106 and reheater 108 have been sufficiently elevated, valve 140 can be closed to shut off the flow from auxiliary boiler 112 to the inlet of reheater 108, as shown in FIG. 4. This is a result of the fact that superheater 106 at this stage no longer cools the fluids, e.g., auxiliary steam, enough to require the extra heat supplied a the inlet of reheater 108 because the components have heated up to at or near the auxiliary steam temperature at this point. This stage occurs when the temperature of superheater 106 reaches around 300° F. to 500° F.

Figure 5:
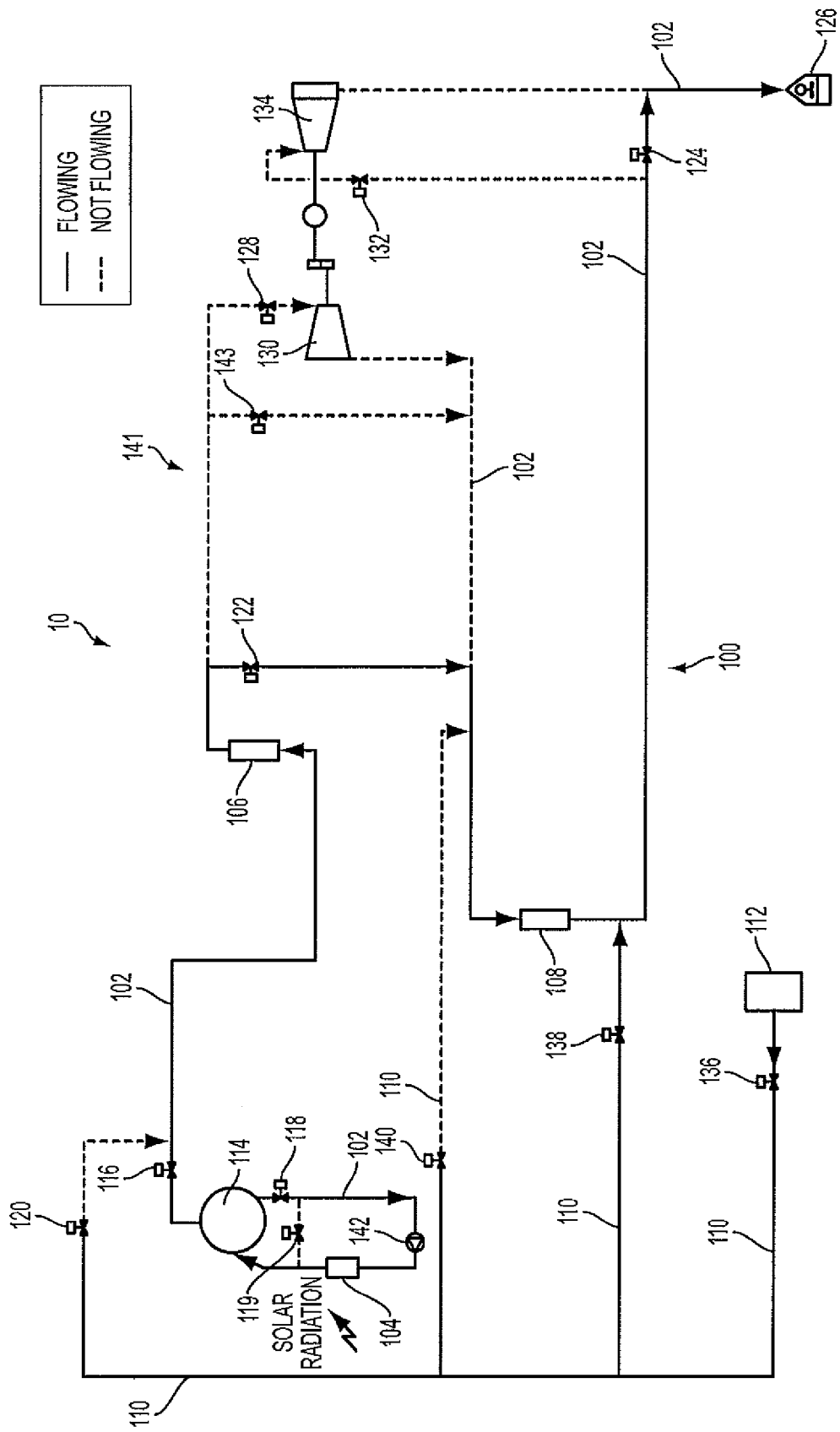
FIG. 5 is a schematic view of the system of FIG. 1, showing the system at a start-up stage where a valve connecting the auxiliary fluid circuit upstream of the superheater is closed, and where a valve connecting the drum to the superheater is open to supply steam to the superheater from the steam generator via the drum.

With reference now to FIG. 5, when temperatures in steam generator 104, superheater 106, and reheater 108 have risen sufficiently, valve 116 can be opened, and valve 120 can be closed. This supplies steam from steam generator 104 to the panels of superheater 106 and brings drum 114 and superheater 106 up to an operational temperature for producing solar power. The step of connecting drum 114 to main fluid circuit 102 puts drum 114 in series with superheater 106 and reheater 108. At this stage, the superheater 106 and reheater 108 are warmed to at or near the same temperature as the auxiliary steam.

Figure 6:
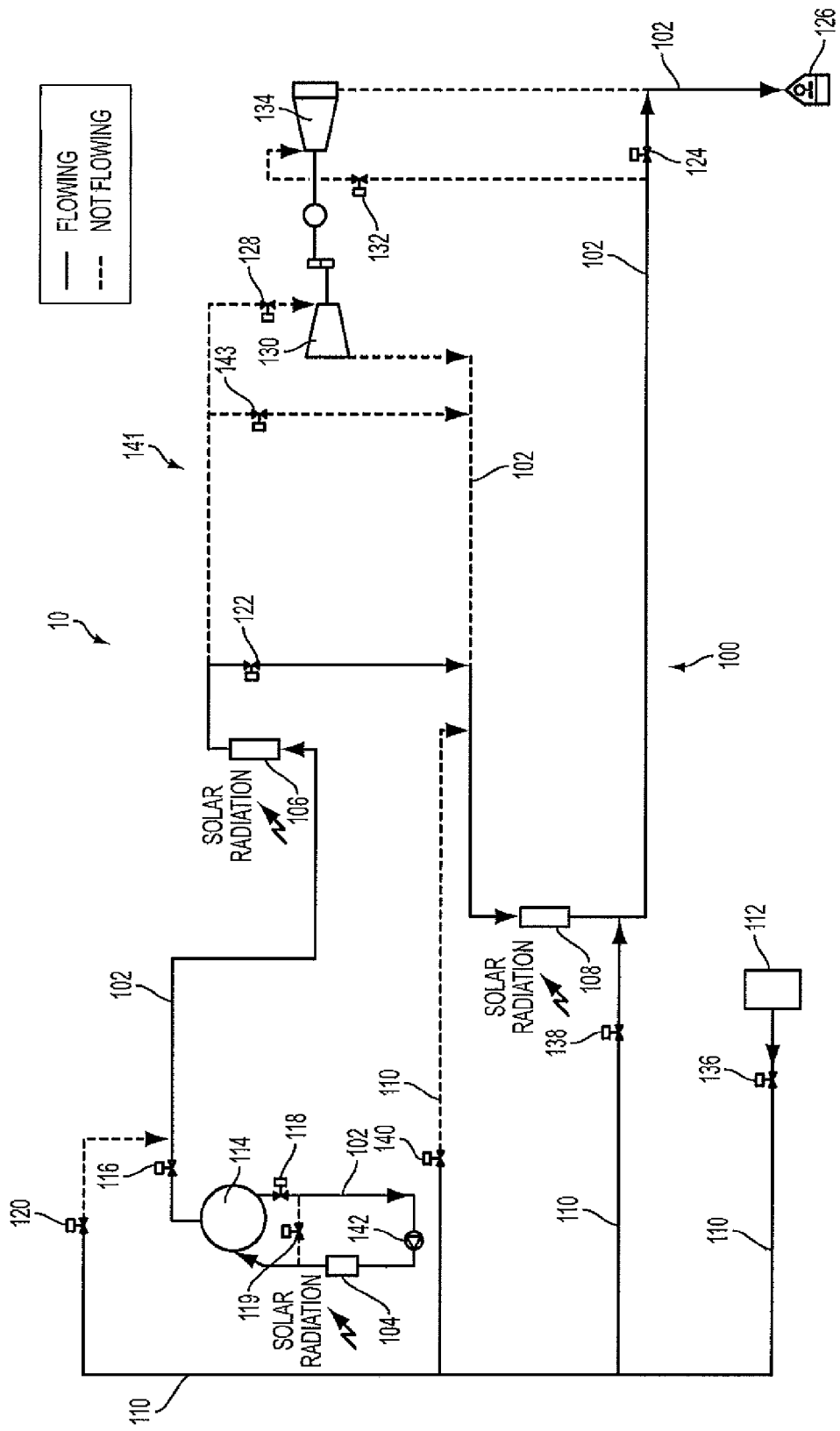
FIG. 6 is a schematic view of the system of FIG. 1, showing the system at a start-up stage where solar energy is applied to the superheater and reheater panels.

Referring now to FIG. 6, at this stage, which occurs after local sunrise, the heat for superheater 106 and reheater 108 is provided from the solar radiation received from heliostats. Auxiliary boiler 112 is only connected to main fluid circuit 102 at this stage via valve 138 to supply heat downstream of reheater 108. This auxiliary boiler heat compensates for cooling that may occur in superheater 106 and reheater 108 as they are being brought up to operational temperature, to protect downstream components from unfavorable thermal gradients.

Figure 7:
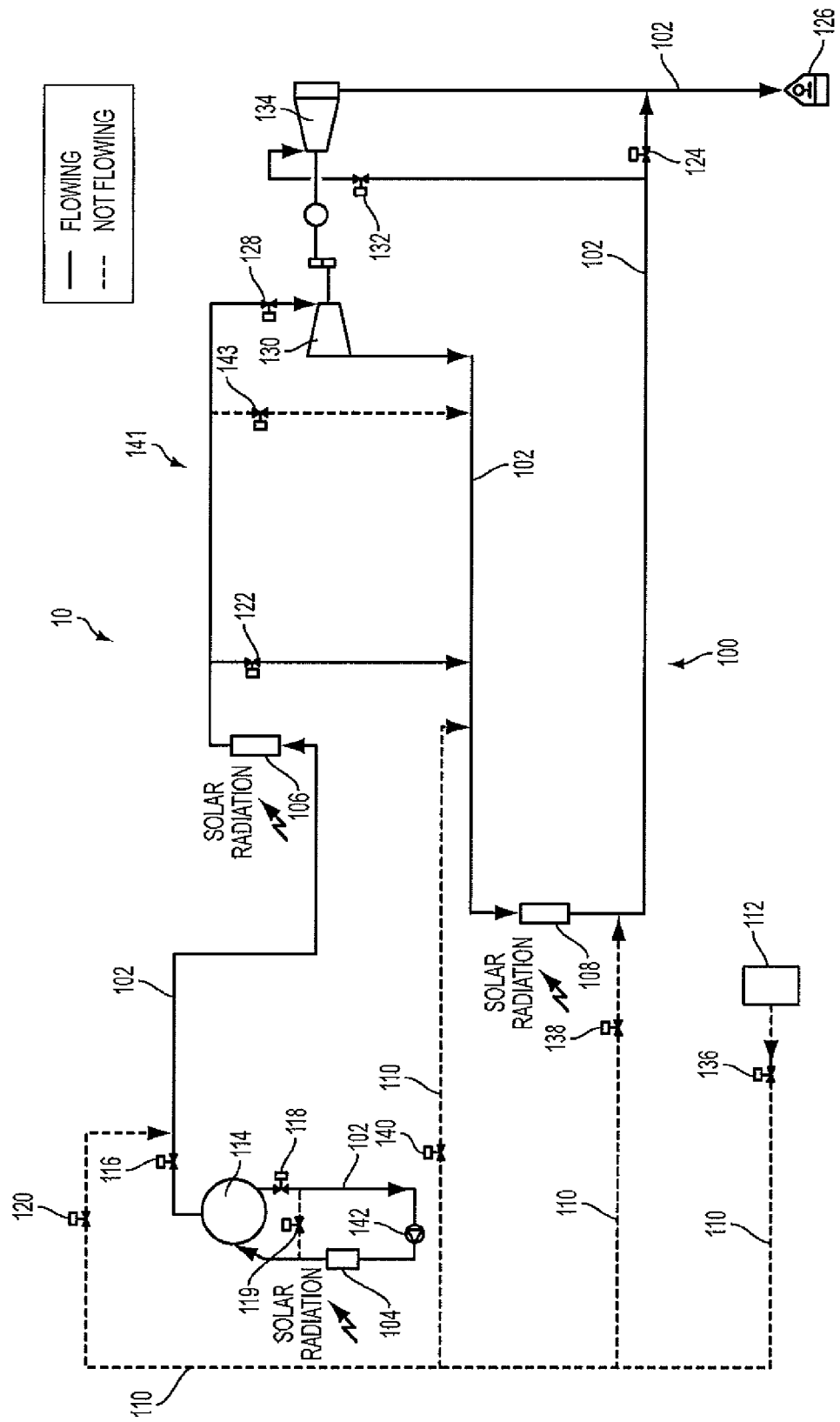
FIG. 7 is a schematic view of the system of FIG. 1, showing the system at a start-up stage where the turbine is connected to the main fluid circuit to initiate rolling of the turbine with steam from the drum.

Referring now to FIG. 7, once temperatures in superheater 106 and reheater 108 have risen sufficiently, and once sufficient solar radiation is available, heliostats directing solar radiation to superheater 106, reheater 108, and steam generator 104 supply heat for full solar power operation. Auxiliary boiler 112 can be shut down and auxiliary fluid circuit 110 can be disconnected from main fluid circuit 102 by closing valve 138.

With continued reference to FIG. 7, first and second turbine stages 130, 134 can be started up as follows. Slightly opening valve 128 and throttling valve 122 rolls first turbine stage 130, bringing it in series between superheater 106 and reheater 108. Slightly opening valve 132 and throttling valve 124 rolls second turbine stage 134, bringing it in series between reheater 108 and condenser 126.

Figure 8:
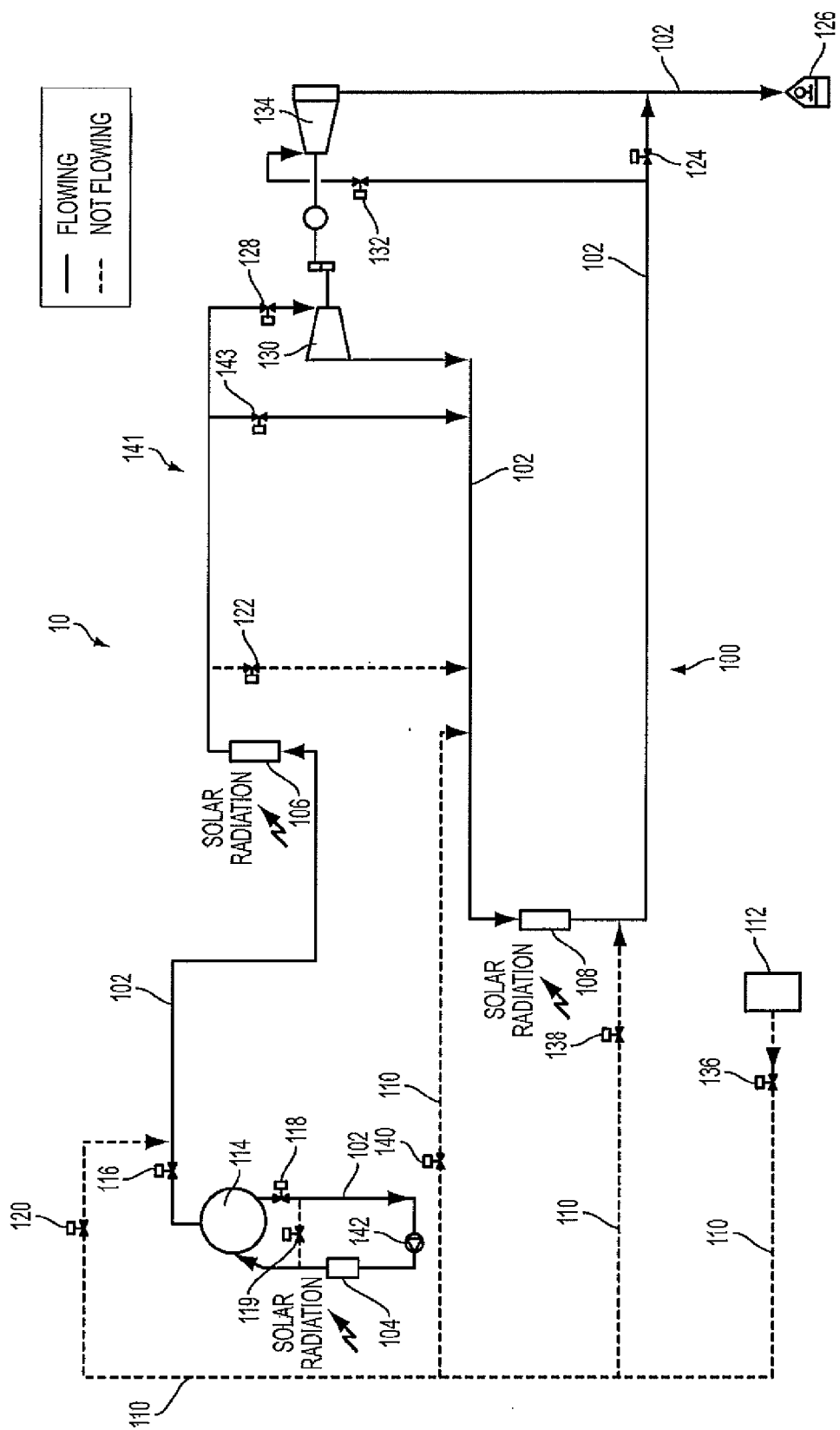
FIG. 8 is a schematic view of the system of FIG. 1, showing loading of the turbine with steam from the superheater and reheater panels.

With reference to FIG. 8, valve 122 is closed and flow is transitioned through valve 143 to maintain pressure in the superheater system. This allows main steam line 141 to receive all of the steam generated in the steam generator panels to continue warming up. Using valves 122 and 143 in this manner is advantageous since the turbine components are typically located remote from the boiler components. The distance between turbine and boiler can be, for example, nearly 500 feet. Start up steam can be routed through valve 122, which is proximate the boiler components, until it reaches a temperature near that maintained over night in the main steam line 141. When the start up steam has reached this temperature, valve 122 can be shut off and valve 143, which is proximate the turbine components, can be used thereafter. Valves 143 and/or 124 can be left partially open to partially bypass the turbine as needed. Those skilled in the art will readily appreciate that in suitable applications, for example where the turbine components are proximate the boiler components, valve 122 can be eliminated without departing from the spirit and scope of the invention.

Figure 9:
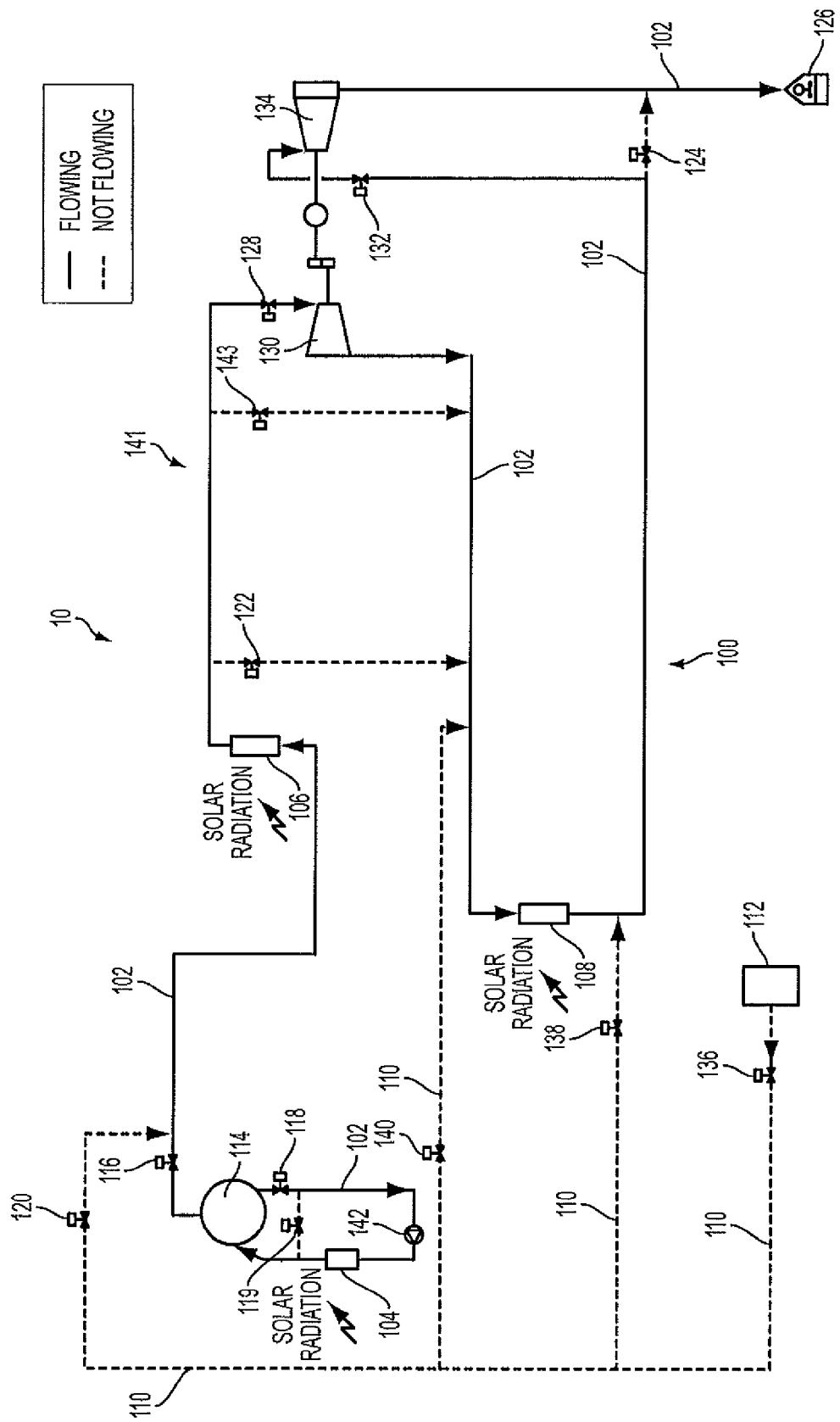
FIG. 9 is a schematic view of the system of FIG. 1, showing the steam turbine accepting full steam and ramping to full load.

With reference to FIG. 9, valves 143 and 124 are completely closed to allow all of the steam generated in steam generator 104 into turbine stages 130, 134. At this stage, system 10 can ramp up to full load and operate under full solar power.

The invention also provides a method of shutting down a solar boiler system, e.g., system 10 with solar boiler 100, to enable subsequent rapid startup. The method can be advantageously used, for example, to shut down a solar boiler for a night time layover. Shut down is initiated by cooling fluids in main fluid circuit 102 to a temperature below operational temperature for power production. The step of cooling can be initiated prior to local sunset as the solar radiation intensity becomes attenuated. The cooling can also be accomplished even in strong sunlight simply by directing sunlight from the heliostats away from the solar boiler panels as needed. Since the boiler tubes of the panels are hotter than the surrounding environment, the panels lose heat to the environment by convection and radiation when the solar radiation is withheld.

Cooling the system too rapidly can be as damaging just as can heating it too rapidly. However, the cooling process can be controlled by initiating the shutdown procedure before sunset, while plenty of solar energy is still available. The boiler is slowly ramped down in load and temperature following pre-determined temperature change limits, which can be determined by those skilled in the art on an application specific basis. When the boiler reaches a minimum load and operating temperature, natural cooling commences, which can be uncontrolled since the temperatures are cool enough to preclude damage at this stage.

When the fluids in the drum have been cooled to a temperature within ±200° F. of maximum operating temperature of auxiliary boiler 112, drum 114 is isolated from main fluid circuit 102, including the solar boiler panels, by closing drum isolation valve 116. An exemplary maximum operating temperature for an auxiliary boiler 112 for typical applications can range from around 300° F. to 752° F. Valve 118 is also closed off to isolate drum 114 from the cooling panels of steam-generator 104. In this manner, drum 114 is isolated from the solar boiler panels as they continue to cool to around ambient temperature, and flow through steam generator 104, superheater 106, and reheater 108 is shut off. Drum 114 is thermally insulated to preserve heat therein and to reduce the amount of heating required to restart system 10 subsequently. Additionally, the larger pipes and headers associated with drum 114 can optionally be insulated for the same purpose. Since drum 114 retains much of its heat, subsequent startup of system 10 is expedited. Since drum 114 is insulated and retains much of its heat and pressure during a layover, isolating drum 114 from the rest of main fluid circuit 102 with valves 116, 118 protects the system from large temperature differentials until the rest of main fluid circuit 102 can be brought up in temperature to reduce or eliminate the differential. The remaining valves can be returned to the state shown in FIG. 1, to await startup in the manner described above.

The methods and systems described above reduce start up time, allow for earlier completion of start up on a daily basis, and preserve the fatigue and creep/fatigue life of the solar boiler components. The methods and systems also preserve the temperature to a controlled point during overnight layover of solar boilers, or any other time shut down is required.

If freezing layover temperatures are expected, after valves 116 and 118 are closed, superheater 106 and reheater 108 can be completely drained and kept under vacuum during the layover to prevent freezing therein. In order to avoid draining steam generator 104, valve 119 can be opened and pump 142 can be activated to circulate fluids through steam generator 104. The combination of moving water and heat generated by pump 142 can thus be used to prevent water freezing in steam generator 104.

The methods and systems of the present invention, as described above and shown in the drawings, provide for systems and methods for startup and shut down of solar boilers with superior properties including rapid start up. While the apparatus and methods of the subject invention have been shown and described with reference to preferred embodiments, those skilled in the art will readily appreciate that changes and/or modifications may be made thereto without departing from the spirit and scope of the subject invention.

What is claimed is:

1. A method of starting up a solar boiler comprising:
   a) circulating fluids heated by an auxiliary boiler through an auxiliary fluid circuit that includes a plurality of superheater panels to elevate temperatures within the superheater panels;
   b) circulating fluids through a plurality of steam generator panels exposed to solar radiation to elevate temperatures within the steam generator panels; and
   c) supplying steam from the steam generator panels to the superheater panels to bring a drum and superheater panels up to an operational temperature for producing solar power by:
      i) connecting the drum to the steam generator panels;
      ii) connecting the drum to the superheater panels by opening a drum isolation valve connected between the drum and the superheater panels; and
      iii) disconnecting the auxiliary boiler from the superheater panels by closing an auxiliary boiler bypass valve connected between the superheater panels and the auxiliary boiler; and
   d) timing the step of connecting the drum to the steam generator panels to occur after local sunrise, wherein the step of connecting the drum to the superheater panels includes heating the superheater panels with solar heat flux.

2. A method as recited in claim 1, wherein the step of connecting the drum to the superheater panels includes connecting a plurality of reheater panels in series between the superheater panels and a condenser to bring the superheater panels and the reheater panels up to an operational temperature for producing solar power.

3. A method as recited in claim 2, further comprising connecting a first turbine stage in series between the superheater panels and the reheater panels by opening a first turbine valve connected between the superheater panels and the first turbine stage and closing a first turbine bypass valve connected between the superheater panels and the reheater panels, and connecting a second turbine stage in series between the reheater panels and the condenser by opening a second turbine valve connected between the reheater panels and the second turbine stage and closing a second turbine bypass valve connected between the reheater panels and the condenser.

4. A method as recited in claim 1, wherein the step of circulating fluids through a plurality of steam generator panels exposed to solar radiation to elevate temperatures within the steam generator panels includes heating fluids within the steam generator panels to a temperature within about ±100° F. of that within the drum.

5. A method as recited in claim 4, further comprising initiating the step of circulating fluids heated by an auxiliary boiler through an auxiliary fluid circuit prior to local sunrise.

6. A method of starting up a solar boiler comprising:
   a) circulating fluids heated by an auxiliary boiler through an auxiliary fluid circuit that includes a plurality of superheater panels to elevate temperatures within the superheater panels;
   b) circulating fluids through a plurality of steam generator panels exposed to solar radiation to elevate temperatures within the steam generator panels; and
   c) supplying steam from the steam generator panels to the superheater panels to bring a drum and superheater panels up to an operational temperature for producing solar power by:
      i) connecting the drum to the steam generator panels;
      ii) connecting the drum to the superheater panels by opening a drum isolation valve connected between the drum and the superheater panels; and
      iii) disconnecting the auxiliary boiler from the superheater panels by closing an auxiliary boiler bypass valve connected between the superheater panels and the auxiliary boiler; and
   d) initiating the step of connecting the drum to the superheater panels after local sunrise.

7. A method as recited in claim 6, wherein the step of connecting the drum to the superheater panels includes connecting a plurality of reheater panels in series between the superheater panels and a condenser to bring the superheater panels and the reheater panels up to an operational temperature for producing solar power.

8. A method as recited in claim 7, further comprising connecting a first turbine stage in series between the superheater panels and the reheater panels by opening a first turbine valve connected between the superheater panels and the first turbine stage and closing a first turbine bypass valve connected between the superheater panels and the reheater panels, and connecting a second turbine stage in series between the reheater panels and the condenser by opening a second turbine valve connected between the reheater panels and the second turbine stage and closing a second turbine bypass valve connected between the reheater panels and the condenser.

9. A method as recited in claim 6, wherein the step of circulating fluids through a plurality of steam generator panels exposed to solar radiation to elevate temperatures within the steam generator panels includes heating fluids within the steam generator panels to a temperature within about ±100° F. of that within the drum.

10. A method as recited in claim 9, further comprising initiating the step of circulating fluids heated by an auxiliary boiler through an auxiliary fluid circuit prior to local sunrise.

11. A method of shutting down a solar boiler to enable subsequent rapid startup comprising:
   a) cooling fluids in a main fluid circuit of a solar boiler to a temperature below operational temperature for power production, wherein the main fluid circuit includes a plurality of solar boiler panels and a drum;

b) isolating the drum from the solar boiler panels by closing at least one drum isolation valve in the main fluid circuit, wherein the drum is insulated to preserve heat therein when isolated from the solar boiler panels wherein the step of cooling includes cooling fluids in the drum to a temperature within ±200° F. of maximum operating temperature of an auxiliary boiler operatively connected to the main fluid circuit to be brought selectively into fluid communication therewith to heat portions of the main fluid circuit during startup; and c) initiating the step of cooling prior to local sunset.

12. A method as recited in claim 11, wherein the step of isolating the drum includes cooling fluids in the solar boiler panels to around ambient temperature.

\* \* \* \* \*